(12) United States Patent
Matsushita

(10) Patent No.: US 6,390,364 B1
(45) Date of Patent: May 21, 2002

(54) COMMODITY SALE REGISTRATION SYSTEM

(75) Inventor: Naohiro Matsushita, Mishima (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 0 days.

(21) Appl. No.: 09/729,593

(22) Filed: Dec. 4, 2000

(30) Foreign Application Priority Data

Dec. 7, 1999 (JP) .......................................... 11-347727

(51) Int. Cl.[7] .............................................. G06K 15/00
(52) U.S. Cl. ...................................... 235/383; 235/385
(58) Field of Search ................................. 235/383, 385

(56) References Cited

U.S. PATENT DOCUMENTS 5,198,644 A * 3/1993 Pfeiffer et al. .............. 235/383
5,544,041 A   8/1996 Nekomoto
5,907,143 A   5/1999 Goodwin, III

FOREIGN PATENT DOCUMENTS

| JP | 5-314029  | 11/1993 |
|----|-----------|---------|
| JP | 10-232613 | 9/1998  |

* cited by examiner

Primary Examiner—Harold I. Pitts
(74) Attorney, Agent, or Firm—Frishauf, Holtz, Goodman, Langer & Chick, P.C.

(57) ABSTRACT

When time service sale is carried out by using a shelf label, discount price and remaining time acquired by subtracting the current time from the discount ending time are indicated on the indicator of the shelf label. Moreover, estimated waiting time for customers at the register and allowance time d acquired by subtracting the estimated waiting time from the remaining time are indicated on the indicator. Therefore, customers can purchase time service sale commodities at a discount price with a time margin at the register in the store in a time zone in which time service sale is carried out.

20 Claims, 5 Drawing Sheets

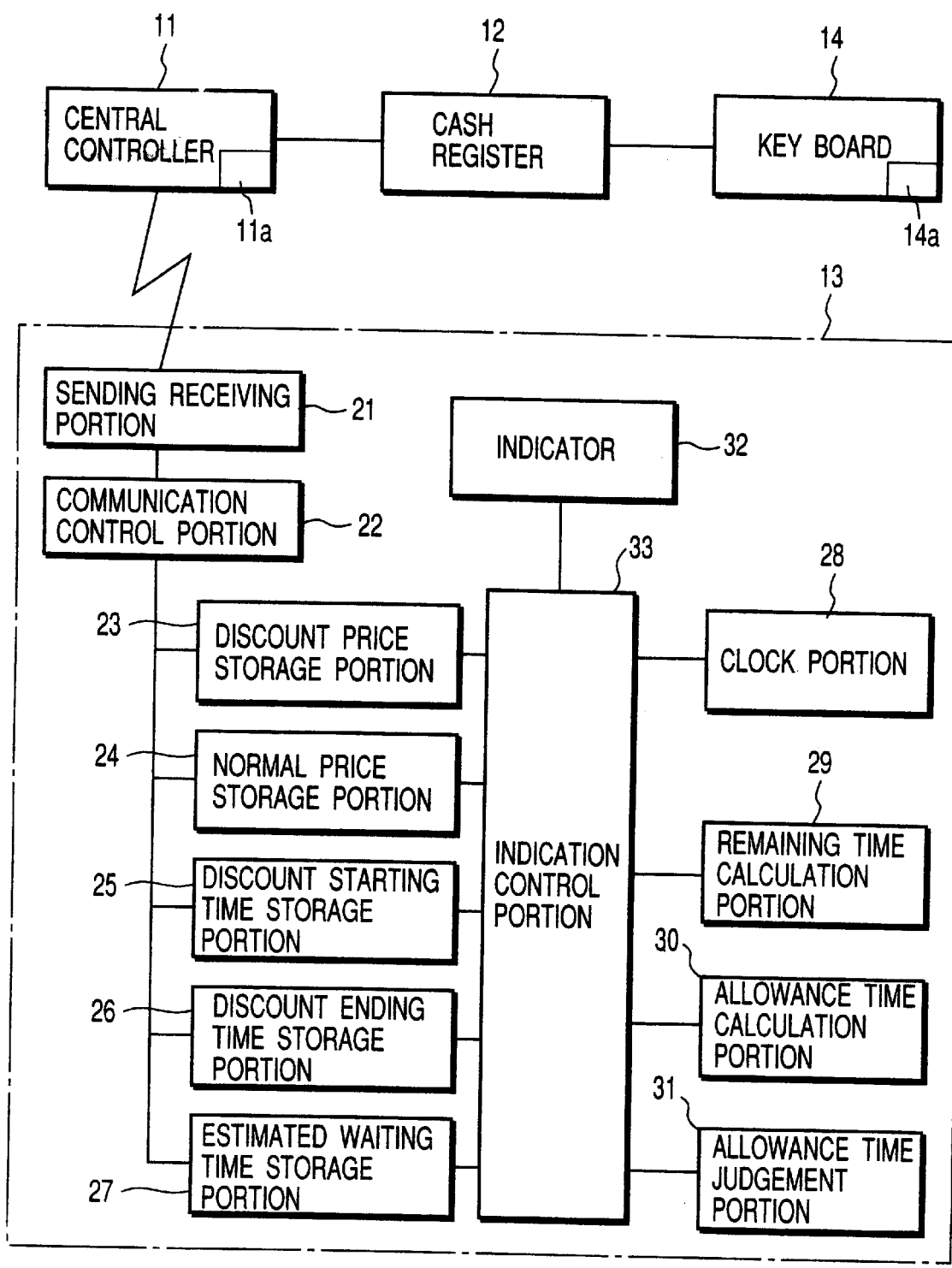
F I G. 1

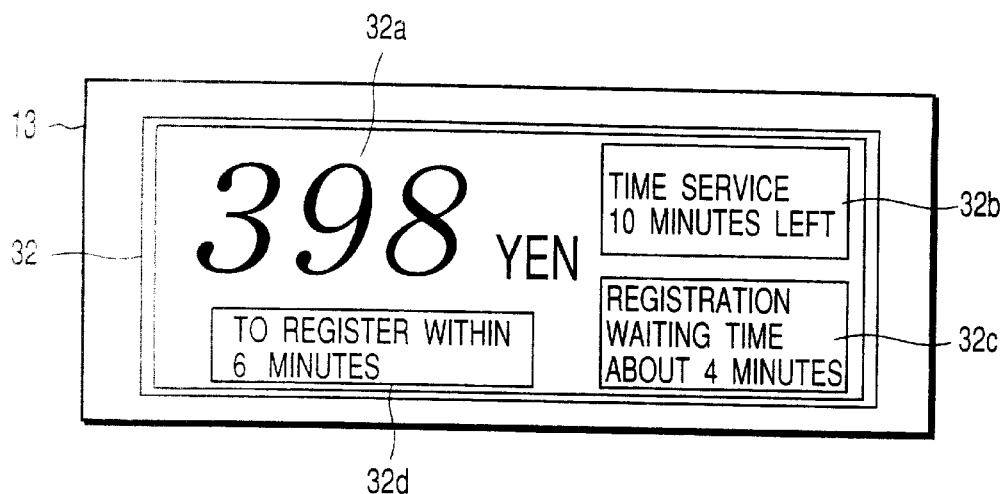
F I G. 3
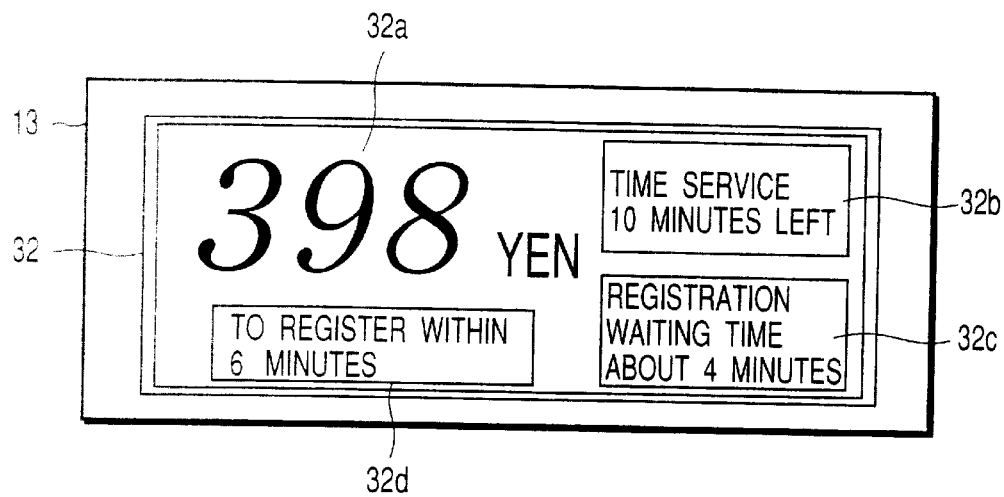
F I G. 4A
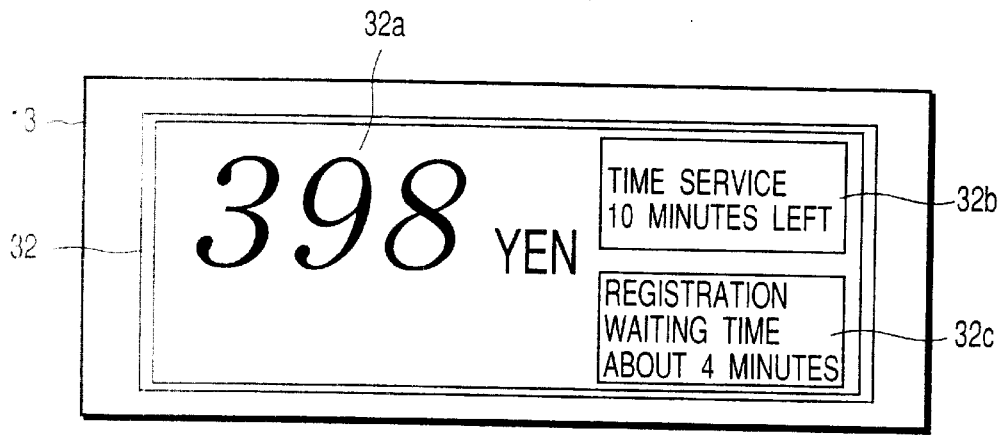
F I G. 4B

COMMODITY SALE REGISTRATION SYSTEM

CROSS-REFERENCE TO RELATED APPLICATIONS

This application is based upon and claims the benefit of priority from the prior Japanese Patent application No. 11-347727, filed Dec. 7, 1999, the entire contents of which are incorporated herein by reference.

BACKGROUND OF THE INVENTION

The present invention relates to a commodity sale registration system including shelf labels disposed on the display shelves or on the commodities and indicating the price information of the commodities respectively.

Conventionally, the commodity sale registration system is used for time service sale in a super market or the like selling foods and gives customers the service price information changed automatically at a specified time from the normal price information of the commodities indicated on the shelf labels.

For example, the system disclosed in Jpn. Pat. Appln. KOKAI Publication No. 5-314029 comprises, as shown in FIG. 9, a central controller 1 called a store controller and a shelf label 2 called a price indicator disposed on the commodity display shelf, and indication changing time and changed data are stored in the central controller 1. At a predetermined time before the indication changing time indication changing time and changed data for time service sale are sent to the shelf label 2.

The shelf label includes a clock means 3 for clocking and outputting the current time, a receiving means 4 for receiving radio signals from the central controller 1, a storage means 5 for storing data indication changing time and changed data received from the central controller 1, and an indication changing means for comparing the current time clocked by means of the clock means 3 and the indication changing time stored in the storage means 5 regularly with each other and for changing the data indicated by means of the indicator 6 to the changed data stored in the storage means 5 when the current time coincides with the indication changing time.

Now, time service sale is often carried out for a specified time zone, for example, from 15:00 to 17:00, and according to this time zone the price information of a commodity indicated on the shelf label 2 are changed to a service price at 15:00 and are returned to a normal price at 17:00. Moreover, the terminal equipment such as cash register or the like making both commodity registration processing and accounting processing with the customers is connected with the central controller 1, and according to the instructions from this central controller 1 the price of a relevant commodity is changed to the service price at 15:00 and is returned to the normal price at 17:00.

Therefore, even if a customer expects to purchase a commodity at the service price about 16:50 according to the indication of the shelf label 2, the service price may have been returned to the normal price because the time is after 17:00 when the relevant commodity is registered by means of the terminal equipment due to a crowded store or subsequent behaviors of the customer. In such a case there is a difference between the price of the commodity that the customer has expected and the actually registered price of the commodity, what leads to problems.

BRIEF SUMMARY OF THE INVENTION

The present invention has an object of providing a commodity sale system and a shelf label enabling customers to purchase time service sale commodities at a discount price with a time margin at the register in the store in a time zone in which time service sale is carried out by using a shelf label.

Therefore, the invention prevents problems due to a different price in registering a commodity by indicating not only the price of the commodity but also the ending time of service sale or a period of time till the ending time on the shelf label in order to arouse customers' attention.

In order to achieve the above object, according to one aspect of the present invention, there is provided a commodity sale registration system comprising: a central controller 11 for storing information including price information of each commodity, a terminal equipment connected with the central controller for making both sale registration processing of commodities purchased by customers based upon the price information of each commodity stored in the central controller and accounting processing with the customers based upon the registered sum of money, and a shelf label located on the commodity display shelf corresponding to each commodity and having an indicator for indicating information including price information received from the central controller, and the shelf label includes a first indication means for indicating a special price on the indicator when the current time is within a predetermined time zone and indicating a normal price thereon when the current time is not within the predetermined time zone, and second indication means for indicating either the ending time of the predetermined time zone or remaining time acquired by subtracting the current time from the ending time on the indicator when the current time is within the predetermined time zone.

The shelf label further includes a waiting time acquisition means for acquiring estimated accounting processing waiting time for a customer from the terminal equipment via the central controller and a third indication means for indicating the estimated waiting time acquired by means of the waiting time acquisition means on the indicator.

The shelf label further includes a third indication means for indicating a period of time acquired by subtracting the estimated accounting processing waiting time acquired by means of the waiting time acquisition means from remaining time acquired by subtracting the current time from the ending time in the predetermined time zone as allowance time on the indicator when the current time is within the predetermined time zone.

The shelf label further includes a means for giving a warning by using the indicator when the allowance time is shorter than the predetermined period of time.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing the configuration of a commodity sale registration system according to the present invention;

FIG. 3 is a view showing an indication form of the shelf label according to one embodiment of the present invention in service sale;

FIGS. 4A and 4B are views showing examples of warning indication of the shelf label in the same embodiment;

DETAILED DESCRIPTION OF THE INVENTION

Figure 2:
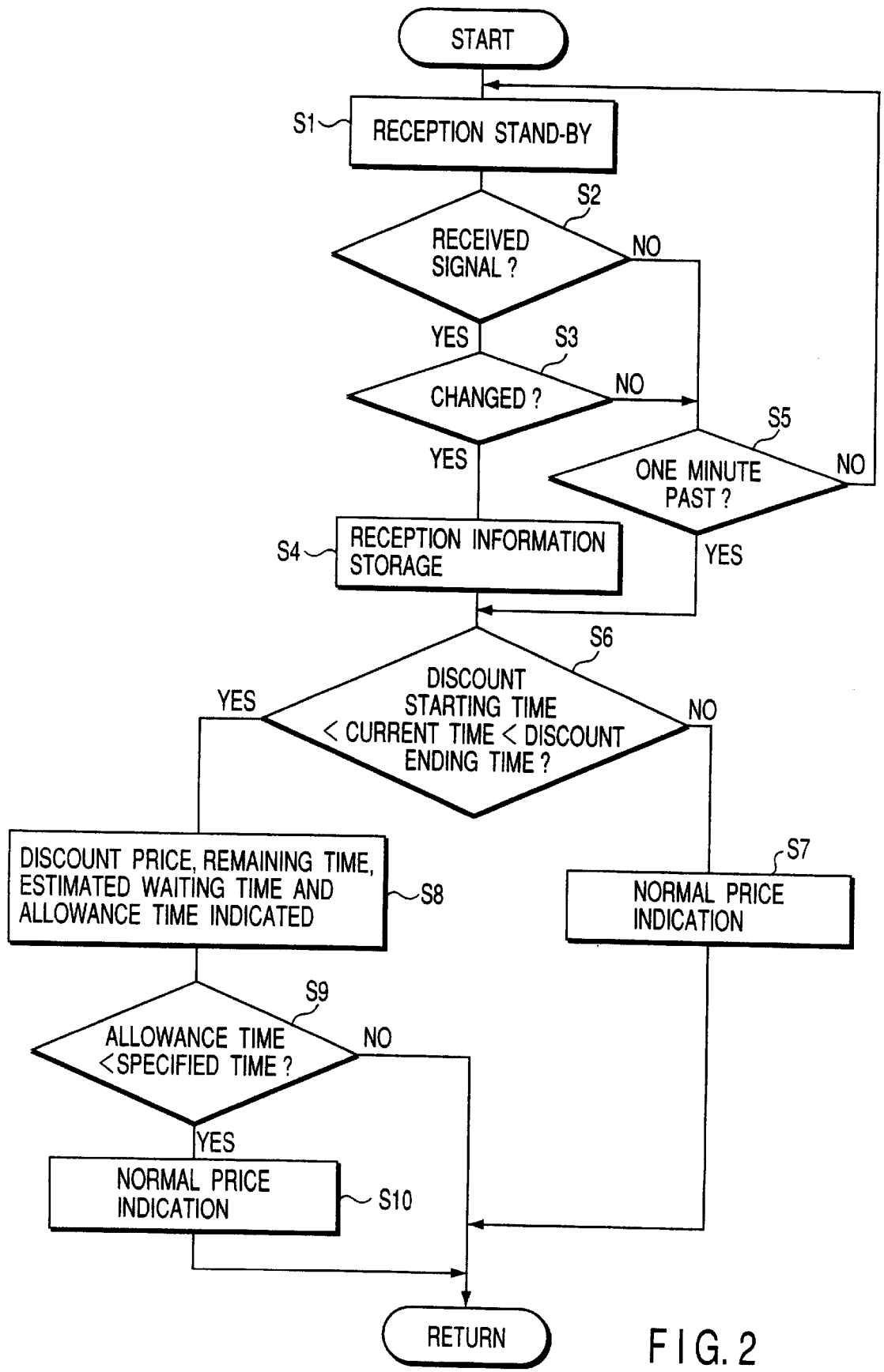
FIG. 2 is a flowchart showing the operation of a shelf label according to the present invention.
Figure 5:
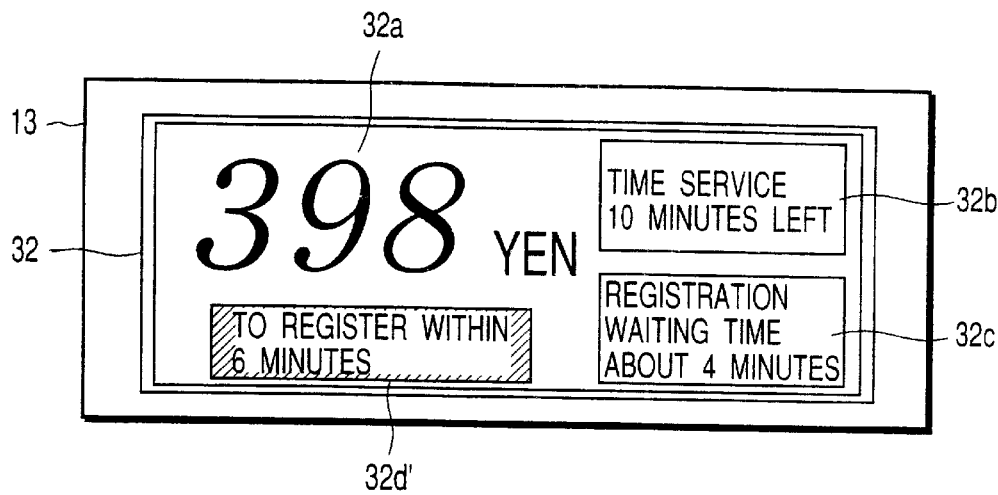
FIG. 5 is a view showing another example of warning indication of the shelf label.

Now, referring to the drawings, an embodiment of the present invention will be described.

FIG. 1 is a block diagram showing the configuration of a commodity sale registration system according to the present invention. A central controller 11 is connected with a cash register 12 as terminal equipment via cables and communicates with a shelf label 13 by means of radio. The shelf label 13 is located on the commodity display shelf corresponding to each commodity.

The central controller 11 is a host computer and includes a storage device for storing a management file setting price information and the like of each commodity, a cable network communication device for communicating with the cash register by means of cables, a radio network communication device for communicating with the shelf label by means of radio and the like.

The cash register 12 is connected with a keyboard, includes an indicator, a printer, a barcode scanner, a storage portion and the like, and registers the commodities which a customer put in the shopping basket respectively in the storage portion after having walked up and down the store by using the barcode scanner or keyboard 14. Moreover, the cash register 12 indicates the registered data on the indicator and prints them on a receipt paper by means of the printer. Finally, the cash register 12 indicates a sum of money to be paid by the customer on the indicator by adding up registered accounts by means of the keyboard 14, prints the sum of money by means of the printer, issues a receipt, and makes an accounting processing with the customer. Further, in the registration processing, the cash register 12 inquires the central controller 11 and receives information such as commodity name, price, classification code and the like of the relevant commodity from the management file of the central controller 11. And the cash register 12 registers these received information concerning the commodity in the storage portion. When there are a plurality of commodities to be registered, the above-described inquiry and registration operations are repeated.

The shelf label 13 has an inherent identification number, and the central controller 11 distinguishes a plurality of shelf labels from each other by these identification numbers.

The shelf label 13 includes a sending-receiving portion 21 bearing a physical interface for the radio network communication device of the central controller 11 and a communication control portion 22 for controlling the sending-receiving operation of the sending-receiving portion. Further, as a physical interface form to the central controller there are several forms using inductive radio, specified MH-radio, weak radio waves, infrared rays, ultrasonic waves and the like.

Moreover, the shelf label includes a discount price storage portion 23 for storing discount prices of commodities for service sale, a normal price storage portion 24 for storing normal prices of commodities, a discount starting time storage portion 25 for storing the discount starting time, an estimated waiting time storage portion 27 for storing estimated waiting time, a clock portion 28 for clocking the current time, a remaining time calculation portion 29 for calculating remaining time, an allowance time calculation portion 30 for calculating allowance time, an allowance time determination portion 31, an indicator 32 such as a liquid crystal indicator or an electro-chromic indicator, and an indication control portion 33 for driving and controlling this indicator 32.

When the number of customers waiting for the accounting processing is inputted by means of a number-of-customers input portion 14a located in the keyboard 14, the cash register 12 sends this number-of-customers information to the central controller 11. The central controller calculates estimated waiting time based upon the received number-of-customers information by means of the determination portion 11a and sends this calculated estimated waiting time to the shelf label 13. This shelf label 13 stores the received estimated time in the estimated time storage portion 27. When the shelf label 11 calculates estimated waiting time, the estimated waiting time is calculated on a basis of, for example, two minutes per customer. This basis can be set by means of software based upon the empirical rules in the store.

With respect to non-service sale commodities, the normal price of each commodity and the identification number of the shelf label 13 indicating it are stored in the management file of the central controller 11. With respect to service sale commodities, the normal price and the discount price of each commodity and the identification number of the shelf label 13 indicating them, as well as the discount starting time and the discount ending time are stored in the management file.

Now, the operation of the commodity sale registration system according to the present invention will be described. FIG. 2 is a flowchart showing the operation of this commodity sale registration system, in particular, of the shelf label 13.

The communication control portion 22 of the shelf label 13 waits, as in Step S1, for information reception from the central controller 11. The central controller 11 distinguishes the shelf label by means of an identification number and sends information of normal price, discount price, discount starting time and discount ending time to the shelf label 13 corresponding to a service sale commodity.

The shelf label 13 receives these information (Step S2), stores the normal price in the normal price storage portion 24, stores the discount price in the discount price storage portion 23, stores the discount starting time in the discount starting time storage portion 25 and stores the discount ending time in the discount ending time storage portion 26 (Step S4).

In the shelf label 13, the indication control portion 33 compares the current time with the discount starting time in the discount starting time storage portion 25 and the discount ending time in the discount ending time storage portion 26 (Step S6), and when the current time is not within a predetermined time range from the discount starting time to the discount ending time, the indication control portion 33 reads out the normal price from the normal price storage portion 24 and indicates it on the indicator 32 (Step S7).

When there are no received signals in Step S2, or when the same information with the already received information is received (in case of NO in Step S3), the flow moves to Step S5. The indication control portion 33 confirms, as in Step S5, the current time regularly, for example, every minute and makes a comparison processing of Step S6 every time one minute passes.

In Step S6, when the current time is within a range from the discount starting time to the discount ending time, the indication control portion 33 not only reads out the discount price from the discount price storage portion 24 and indicates it on the indicator 32, but also causes the remaining time calculation portion 29 to calculate remaining time by subtracting the current time from the discount ending time and indicates this calculated remaining time on the indicator 32. Moreover, the indication control portion 33 indicates estimated waiting time in the estimated waiting time storage portion on the indicator 32. Further, the allowance time calculation portion 30 subtracts the estimated waiting time from the remaining time and calculates allowance time in order to let customers know till when they must reach the location of the cash register 12, and the indication control portion 33 indicates this calculated allowance time on the indicator 32 (Step S8).

Therefore, on the indicator 32 of the shelf label 13, as shown FIG. 3, discount price 32a, remaining time 32b, estimated waiting time 32c and allowance time 32d are indicated respectively. And, when the allowance time 32d is shorter than a previously set specified time, the indication of the allowance time 32 is, as shown in FIGS. 4A and 4B, changed to a blinking warning indication. As this specified time, a period of time including time of several minutes added to time required for a customer to reach the location of the cash register 12 with a normal walking speed, for example, when the customer is at the longest distance from the cash register 12 in the store may be set. The addition of several minutes gives customers allowance for purchasing other commodities and is friendly to the aged with a slow walking speed.

Further, the numerical values of the discount price 32a, the remaining time 32b, the estimated waiting time 32c and the allowance time 32d are indicated in seven segments, and other characters and symbols are indicated in a fixed form.

As described above, since the remaining time is indicated together with the discount price of the corresponding commodity on the indicator 32 of the shelf label 13, customers can recognize how much time is left till the service sale of this commodity comes to an end when they put this commodity in the shopping basket.

Therefore, when they subsequently walk up and down the store, they are aware of time till the end of the service sale and can reach the location of the cash register 12 with a time margin. Therefore, at the cash register 12 the relevant commodity is registered at the discount price.

Moreover, the estimated waiting time at the cash register 12 is also indicated on the indicator of the shelf label 13, customers can reach the location of the cash register 12 with a time margin by taking the estimated waiting time into consideration. Therefore, at the cash register 12 the relevant commodity is registered with certainty at the discount price.

Moreover, since the allowance time for reaching the cash register is also indicated on the indicator 32 of the shelf label 13, customers can recognize how much allowance time they have when they go to the cash register 12 after having stopped at other sale counters.

Therefore, at the cash register 12 the relevant commodity is registered with certainty at the discount price.

Moreover, since the indication of the allowance time is blinked when the allowance time is shorter than the specified time, customers can recognize that the end of the effective time for registering the commodity with a discount price is pressing and go to the location of the cash register 12 in a hurry. Therefore, at the cash register 12 the relevant commodity is registered with certainty at the discount price.

As described above, by indicating remaining time, estimated waiting time and allowance time as measures for being capable of registering a commodity at an indicated price on the shelf label 13 indicating the price of the commodity, customers' attention is aroused and problems due to a different price in registering the commodity can be prevented. Further, by indicating a warning, customers' attention is aroused more strongly and problems due to a different price in registering the commodity can be prevented more certainly.

Figure 6:
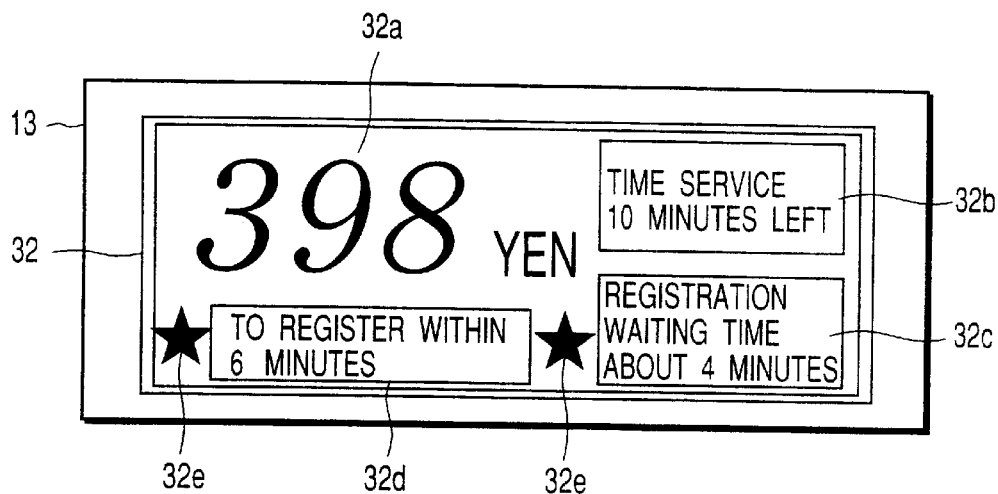
FIG. 6 is a view showing a further example of warning indication of the shelf label.
Figure 7:
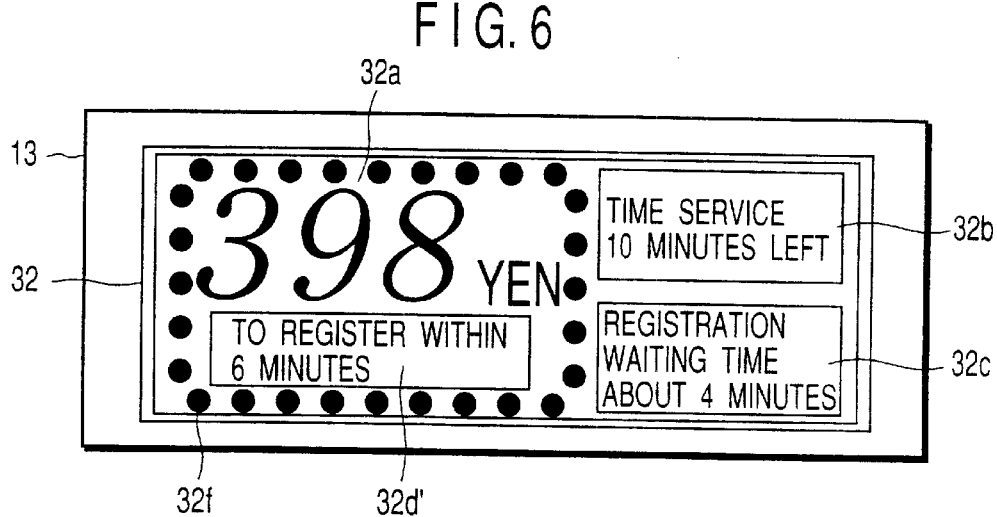
FIG. 7 is a view showing a still further example of warning indication of the shelf label.

Still more, in this embodiment, as a warning indication a warning indication of blinking the indication of allowance time d is made, however, the warning indication is not limited thereto, and, as shown in FIG. 6, a warning indication may be made by changing over to an indication d⁻ indicating allowance time 32d with a different color, or, as shown in FIG. 6, a warning indication may be made by indicating an asterisk 32e arousing customers' attention around the indication of allowance time 32d, or, as shown in FIG. 7, a warning indication may be made by indicating a symbol 32f surrounding the indications of discount price 32a and allowance time 32d.

Figure 8:
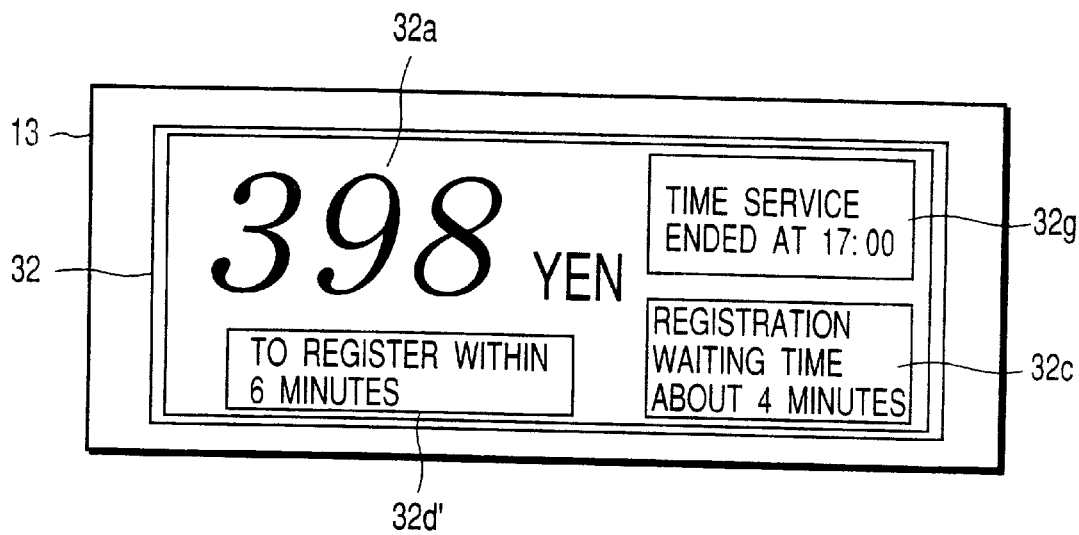
FIG. 8 is a view showing another indication form of the shelf label in service sale.
Figure 9:
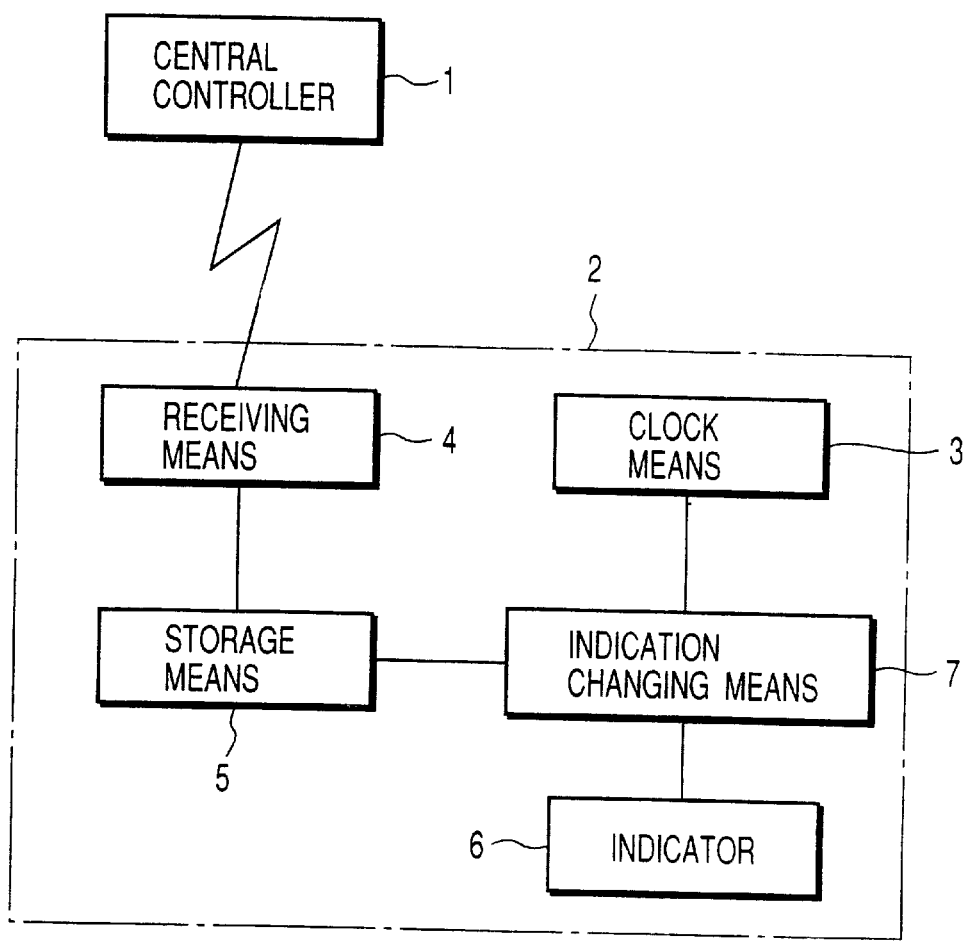
FIG. 9 is a block diagram showing the configuration of a conventional system.

Further, in this embodiment, remaining time acquired by subtracting current time from discount ending time is indicated on the indicator 32, however, as shown in FIG. 8, discount ending time 32g stored in the discount ending time storage portion 26 may be indicated directly.

As described above, according to the present invention, there is provided a commodity sale system and a shelf label enabling customers to purchase time service sale commodities at a discount price with a time margin at the register in the store in a time zone in which time service sale is carried out by using a shelf label.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A commodity sale registration system comprising:

a central controller for storing information including price information of each commodity;

a terminal equipment connected with said central controller for making both sale registration processing of commodities purchased by customers based upon the price information of each commodity stored in the central controller and accounting processing with the customers based upon the registered sum of money; and a shelf label located on the commodity display shelf corresponding to each commodity and having an indicator for indicating information including price information received from the central controller, wherein
said shelf label includes a first indication means for indicating a special price on the indicator when the current time is within a predetermined time zone and indicating a normal price thereon when current time is not within said predetermined time zone, and second indication means for indicating one of ending time of said predetermined time zone and remaining time acquired by subtracting the current time from the ending time on said indicator when the current time is within said predetermined time zone.

2. The system according to claim 1, wherein
said shelf label includes a waiting time acquisition means for acquiring estimated accounting processing waiting time for a customer at said terminal equipment from said terminal equipment via said central controller; and
a third indication means for indicating said estimated waiting time acquired by means of said waiting time acquisition means on said indicator.

3. The system according to claim 1, wherein said terminal equipment has a means for sending the number of customers waiting for said accounting processing to said central controller;
said central controller has a means for sending estimated accounting processing waiting time determined from said number of customers received form said terminal equipment to said shelf label; and
said shelf label includes a third indication means for indicating said estimated accounting processing waiting time received from said central controller on said indicator.

4. The system according to claim 1, wherein
said shelf label includes a waiting time acquisition means for acquiring estimated accounting processing waiting time for a customer at said terminal equipment from said terminal equipment via said central controller; and
a third indication means for indicating a period of time acquired by subtracting said estimated accounting processing waiting time acquired by means of said waiting time acquisition means from remaining time acquired by subtracting the current time from the ending time in said predetermined time zone as allowance time on said indicator when the current time is within said predetermined time zone.

5. The system according to claim 4, wherein
said shelf label includes a means for giving a warning by using said indicator when said allowance time is shorter than a predetermined period of time.

6. A commodity sale registration system comprising:
a central controller for storing information including price information of each commodity;
a terminal equipment connected with said central controller for making both sale registration processing of commodities purchased by customers based upon the price information of each commodity stored in the central controller and accounting processing with the customers based upon the registered sum of money; and
a shelf label located on the commodity display shelf corresponding to each commodity and having an indicator for indicating information including price information received from the central controller, wherein said shelf label includes;
(a) a first indication means for indicating a special price on the indicator when the current time is within a predetermined time zone and indicating a normal price thereon when the current time is not within said predetermined time zone;
(b) a waiting time acquisition means for acquiring estimated accounting processing waiting time for a customer at said terminal equipment from said terminal equipment via said central controller; and
(c) a second indication means for indicating a period of time acquired by subtracting said estimated accounting processing waiting time acquired by means of said waiting time acquisition means from remaining time acquired by subtracting the current time from ending time in said predetermined time zone as allowance time on said indicator when the current time is within said predetermined time zone.

7. The system according to claim 6, wherein
said shelf label includes second indication means for indicating one of ending time of said predetermined time zone and remaining time acquired by subtracting the current time from the ending time on said indicator when the current time is within said predetermined time zone.

8. The system according to claim 6, wherein
said shelf label 13 includes a third indication means for indicating said estimated waiting time acquired by means of said waiting time acquisition means on said indicator.

9. The system according to claim 6, wherein
said shelf label includes a means for giving a warning by using said indicator when said allowance time is shorter than a predetermined period of time.

10. A shelf label located on the commodity display shelf corresponding to each commodity for indicating information including price information of each commodity received from the central controller storing said information comprising:
a receiving portion for receiving information from said central controller;
price information storage portions for storing a special price and a normal price received from said central controller via said receiving portion;
time information storage portions for storing starting time and ending time in a specified time zone received from said central controller via said receiving portion;
a determination means for determining whether the current time is within said specified time zone or not;
a first indication means for indicating a special price stored in said price information storage portion on the indicator when the current time is determined to be within said specified time zone by means of said determination means and indicating said normal price thereon when the current time is not within said specified time zone;
a remaining time calculation portion for calculating remaining time by subtracting the current time from said ending time; and
second indication means for indicating one of ending time of said specified time zone and remaining time acquired by subtracting the current time from the ending time on said indicator when the current time is within said specified time zone.

11. The shelf label according to claim 10, further comprising:
a waiting time acquisition means for acquiring estimated accounting processing waiting time for a customer at said terminal equipment from said terminal equipment which makes an accounting processing for a customer, via said central controller; and a third indication means for indicating said estimated waiting time acquired by means of said waiting time acquisition means on said indicator.

12. The shelf label according to claim 10, further comprising:

a waiting time acquisition means for acquiring estimated accounting processing waiting time for a customer at said terminal equipment from said terminal equipment which makes an accounting processing for a customer, via said central controller;

a remaining time calculation portion for calculating remaining time by subtracting the current time from said ending time when the current time is within a predetermined time zone;

an allowance time calculation means for calculating allowance time by subtracting said accounting processing waiting time acquired by means of said waiting time acquisition means from said remaining time; and a third indication means for indicating said allowance time calculated by means of said allowance time calculation means on said indicator.

13. The shelf label according to claim 12, further comprising:

a means for giving a warning by using said indicator when said allowance time is shorter than a predetermined period of time.

14. The system according to claim 12, further comprising:

a fourth indication means for indicating said estimated waiting time acquired by means of said waiting time acquisition means on said indicator.

15. The shelf label according to claim 14, further comprising:

a means for giving a warning by using said indicator when said allowance time is shorter than a predetermined period of time.

16. A shelf label located on the commodity display shelf corresponding to each commodity for indicating information including price information of each commodity received from the central controller storing said information comprising:

a receiving portion for receiving information from said central controller;

price information storage portions for storing a special price and a normal price received from said central controller via said receiving portion;

time information storage portions for storing starting time and ending time in a specified time zone received from said central controller via said receiving portion;

a determination means for determining whether the current time is within said specified time zone or not;

a first indication means for indicating a special price stored in said price information storage portion on the indicator when the current time is within said specified time zone and indicating said normal price thereon when the current time is not within said specified time zone;

a waiting time acquisition means for acquiring estimated accounting processing waiting time for a customer at the terminal equipment from said terminal equipment making an accounting processing for a customer via said central controller, wherein said terminal equipment makes both sale registration processing of commodities purchased by customers based upon the price information of each commodity stored in this central controller and accounting processing with the customers based upon the registered sum of money;

a remaining time calculation portion for calculating remaining time by subtracting the current time from said ending time;

an allowance time calculation portion for calculating allowance time by subtracting said accounting processing waiting time acquired by means of said waiting time acquisition means from said remaining time calculated by means of said remaining time calculation portion; and a second indication means for indicating said allowance time calculated by means of said allowance time calculation means on said indicator.

17. The shelf label according to claim 16, further comprising:

second indication means for indicating either the ending time of said predetermined time zone or remaining time acquired by subtracting the current time from the ending time on said indicator when the current time is within said predetermined time zone.

18. The shelf label according to claim 16, further comprising:

a third indication means for indicating said estimated waiting time acquired by means of said waiting time acquisition means on said indicator.

19. The shelf label according to claim 16, further comprising:

a means for giving a warning by using said indicator when said allowance time is shorter than a predetermined period of time.

20. The shelf label according to claim 18, further comprising:

fourth indication means for indicating one of ending time of said predetermined time zone and remaining time acquired by subtracting the current time from the ending time on said indicator when the current time is within said predetermined time zone.

* * * * *